JAMES H. LOUGHRIDGE.

117902  *Improved* CARRIAGE WHEEL.  Patented Aug 8 1871

Attest  
R. Hofmann  
T. Van Kannel

Inventor  
James H. Loughridge

UNITED STATES PATENT OFFICE.

JAMES H. LOUGHRIDGE, OF KEY WEST, FLORIDA.

IMPROVEMENT IN CARRIAGE-WHEELS.

Specification forming part of Letters Patent No. 117,902, dated August 8, 1871.

*To all whom it may concern:*

Be it known that I, JAMES H. LOUGHRIDGE, of Key West, in the county of Munroe and State of Florida, have invented a new and Improved Carriage-Wheel: and I do hereby declare that the following is a full, clear, and exact description thereof, reference being had to the annexed drawing making a part of this specification, in which—

Figure 1:
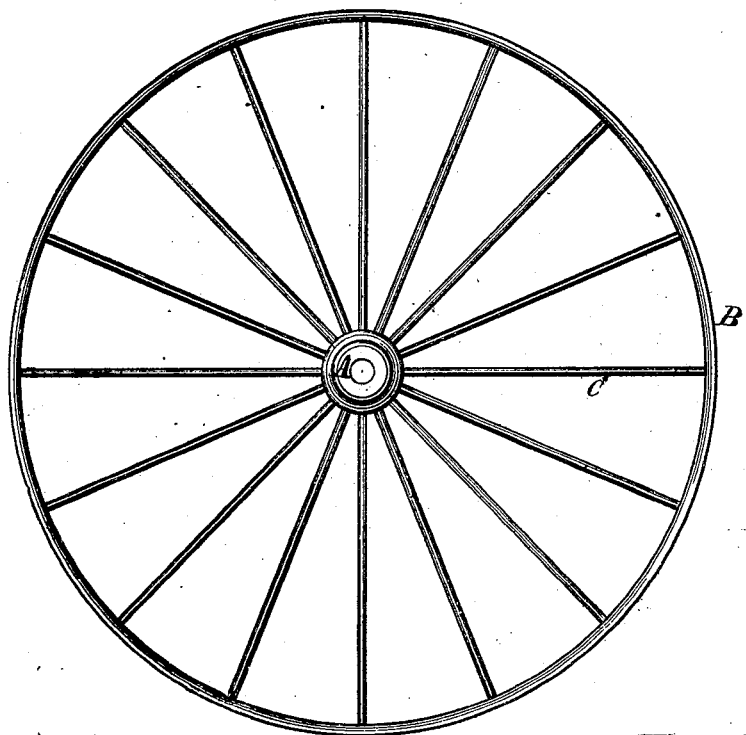
Figure 3:
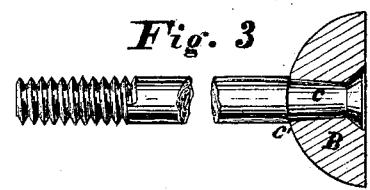
Figure 2:
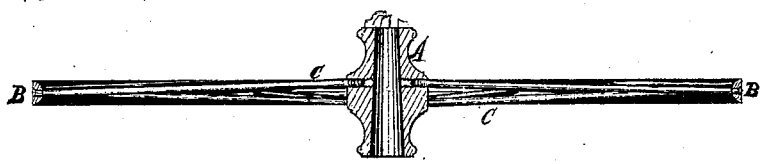

Figure 1 is a side elevation, Fig. 2 a transverse section, and Fig. 3 an enlarged view of a spoke and the tire.

Similar letters of reference indicate like parts.

The nature of my invention relates to a carriage or wagon-wheel made entirely of metal, and so constructed and arranged as to possess all the essential qualities of a good carriage or wagon-wheel. The improvement consists in the construction of the spokes, and the manner in which they are secured to the hub and the rim of the wheel, to be generally described in the following description and specifically pointed out in the claim.

The hub A is made of cast metal, with a tapering aperture for the reception of the journal of the axle. The sockets for the reception of the spokes are formed on a zigzag line around the hub in the ordinary manner, so as to cause the spokes to brace each way. These sockets are tapped and extend through the metal of the hub, opening into the spindle-aperture, so that the spokes C, which are screw-threaded upon the ends entering the sockets, may be screwed so far into the hub, in putting the wheel together, that the diameter of a circle drawn around their extreme outer ends shall be somewhat smaller than the inner diameter of the rim B. In this manner I am enabled to construct the rim B of a single piece of wrought or cast-iron, to be provided with holes corresponding in number and position with the spokes. The latter are constructed with tenons $c$, so that the inner side of the rim B itself shall bear directly against the shoulder $c'$ of the tenons, and an additional tire be dispensed with, if desired.

The rim B, which, by preference, is made of the form clearly shown in Figs. 2 and 3, in putting the wheel together is placed around the spokes, screwed deep into the hub, as described. The spokes are then partly unscrewed so as to cause the tenon of each to enter the corresponding hole in the rims until its shoulder $c'$ firmly braces against the rim. The holes in the rim are countersunk upon the outside, and the tenons—which may be made tapering, as indicated—being of such length as to extend slightly through the rim, are riveted down into these holes so as to be flush with or below the outer surface of the rim, as clearly illustrated in Fig. 3.

What I claim as my invention, and desire to secure by Letters Patent, is—

A wagon-wheel, constructed as herein described, the spokes C of which are screwed into elongated screw-threaded sockets in the hub, and are constructed with tenons $c$ for securing them to the solid continuous rim B, in the manner set forth.

JAMES H. LOUGHRIDGE.

Witnesses:
T. VAN KANNEL,
P. HOFMANN.